April 8, 1952     P. J. H. JANSSEN     2,591,942
REGULATED DIRECT VOLTAGE POWER SUPPLY
Filed Aug. 9, 1950

*INVENTOR.*
PETER JOHANNES HUBERTUS JANSSEN
BY
AGENT

Patented Apr. 8, 1952

2,591,942

UNITED STATES PATENT OFFICE 2,591,942

REGULATED DIRECT VOLTAGE POWER SUPPLY

Peter Johannes Hubertus Janssen, Eindhoven, Netherlands, assignor to Hartford National Bank and Trust Company, Hartford, Conn., as trustee Application August 9, 1950, Serial No. 178,366
In the Netherlands September 8, 1949

5 Claims. (Cl. 321—2)

The present invention relates to direct voltage power supplies and more particularly to direct voltage power supplies for cathode-ray tubes comprising an inductive element included in the output circuit of a discharge tube, the conduction of the discharge tube being controlled so that periodic voltage pulses are produced across the inductive element.

A serious limitation of this type of circuit-arrangement is that the value of the direct voltage produced generally depends upon the value of the load current.

If the load is constituted by a cathode-ray tube which, for example, forms part of a television receiver in which the current strength of the cathode-ray beam is modulated, the load coupled to the direct-voltage source and consequently the direct voltage produced vary. This variation in output direct voltage is undesirable.

Similarly, output voltage variations occur in a circuit-arrangement of the aforesaid type in which a capacitor is coupled in series with the inductance. In this latter arrangement, a direct voltage is applied to the series capacitor to increase the anode voltage of the discharge tube, the direct voltage being derived from the series combination of a rectifier and an inductor inductively coupled to the inductor in the tube anode circuit.

The principal object of the present invention is to provide an improved direct current power supply of the aforesaid type.

More particularly, it is an object of the invention to provide an improved regulated power supply for cathode-ray tubes.

Further objects of the invention will appear from the following description.

With the circuit-arrangement according to the invention, regulation of the output direct voltage is achieved by connecting a second discharge tube in parallel with the capacitor, the second discharge tube being controlled in accordance with the direct-voltage load so that the direct voltage produced is substantially constant.

Figure 1:
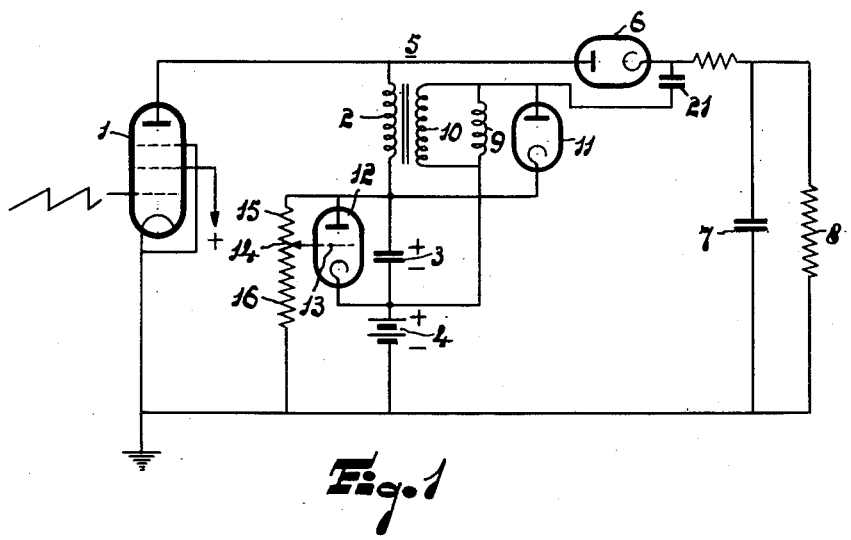
Figure 2:
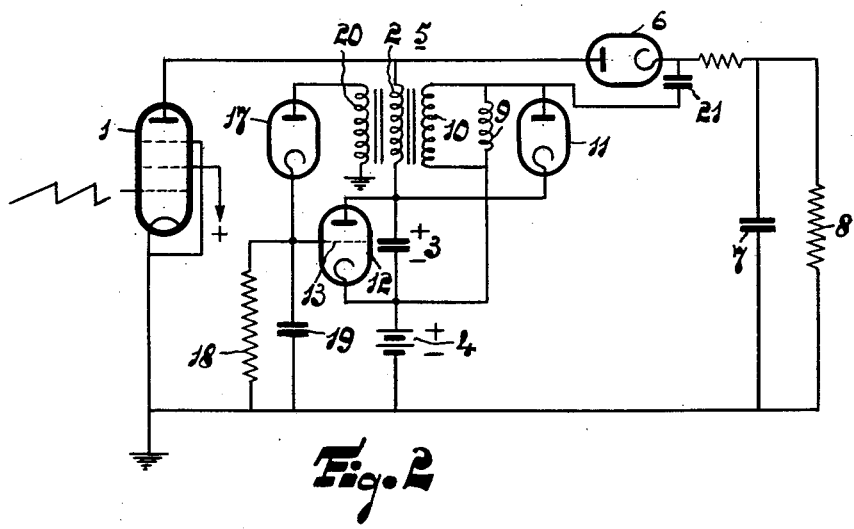

In order that the invention may be more clearly understood and readily carried into effect, it will now be described in detail with reference to the accompanying drawing in which:

Fig. 1 shows one embodiment of a circuit-arrangement according to the invention, and Fig. 2 shows a second embodiment of a circuit-arrangement according to the invention.

Referring now to the drawing and more particularly to Fig. 1, the anode circuit of a tube 1 comprises a series-connection of an inductance 2, a capacitor 3 and a source of direct voltage 4.

The natural capacity of the inductance coil 2 and the capacity of the wiring are effectively in parallel with the said coil. The coil 2 also constitutes the primary of a transformer 5.

If current is periodically produced in the coil 2 and abruptly interrupted, a pulse voltage is produced across the coil. This pulse voltage charges, through a rectifier 6, a capacitor 7. The load, here represented by a resistance 8, is coupled in parallel with capacitor 7.

In the circuit-arrangement shown in Fig. 1, the current flowing through the coil 2, and hence the voltage developed thereacross, is controlled by supplying a sawtooth-voltage together with a suitable negative bias voltage to the control-grid of the discharge tube 1.

The circuit-arrangement may also be used for producing a sawtooth current across the deflection coil of the load constituted by a cathode-ray tube. For this purpose a line deflection coil 9 is connected to a secondary 10 of transformer 5.

The anode supply voltage for the tube 1 is not solely derived from the supply 4; but from the series-combination of the source 4 and the capacitor 3. The voltage across this capacitor, with the polarity indicated in the drawing, is obtained by rectifying, by means of the diode 11, the voltage developed across the winding 10 during the stroke of the sawtooth current.

Such a supply method exhibits the advantage that a lower supply voltage from the anode supply 4 is adequate. However, as has been stated hereinbefore, a limitation of the circuit-arrangement so far described is that a variation of the load produces a variation of the direct voltage produced across the capacitor 7.

Upon variation of the load current, the voltage across the capacitor 3 also varies so that, for example, with an increase in load current, the voltage across the capacitor 3 decreases. Thus, the active direct voltage across the anode circuit of the tube 1 drops. Consequently the value of the voltage pulse developed across coil 2 drops.

In the circuit shown in Fig. 1, a decrease in the voltage across capacitor 3 is accompanied by a decrease in amplitude of the line deflection current through coil 9.

A discharge tube 12, here shown as a triode, is now connected in parallel with the capacitor 3. A control grid 13 of tube 12 is connected to a tapping of a potentiometer 15, 16 which is connected in parallel with the series-combination of the capacitor 3 and the anode-supply-source 4.

This discharge tube 12 constitutes a permanent load for the capacitor 3. The value of this load varies in an opposite sense from the variations of the load resistance 8, so that the voltage across the capacitor 3 and the direct voltage produced across the capacitor 7 remain substantially constant.

If the load resistance 8 decreases, so that the circuit-arrangement is presented with a higher load, the voltage across the capacitor 3 will tend to drop. This, however, results in a decrease in the direct anode voltage of the tube 12, and also a decrease in voltage at the control-grid 13, so that the anode current of the tube 12 decreases, decreasing the load presented to capacitor 3.

The circuit-arrangement shown in Fig. 2, in which parts corresponding to those of the arrangement shown in Fig. 1 have the same reference numerals, differs from the circuit-arrangement shown in Fig. 1 only in that the control-voltage for the control-grid 13 of tube 12 is obtained in a different manner.

In Fig. 2, this control-voltage is derived, upon rectification by means of a rectifier 17, a resistance 18 and a capacitor 19, from the voltage pulses occurring across a third winding 20 of the transformer 5 upon the fly-back of the sawtooth current across coil 2.

If, in this circuit-arrangement, the load resistance 8 decreases, so that the load increases, the voltage across capacitor 3 and consequently also the value of the voltage pulses across the winding 20 drop again. Therefore not only the anode voltage of tube 12 but also the control-grid voltage of this tube tend to decrease, resulting in a decrease in load of capacitor 3.

It should be noted that both in the circuit-arrangement shown in Fig. 1 and in that shown in Fig. 2, not only the voltage pulses occurring across coil 2 but also the pulses occurring across coil 10 upon the fly-back of the sawtooth current are rectified. The last-mentioned pulses have a negative polarity and are supplied through the capacitor 20 to the cathode of the diode 6.

While the invention has been described in specific embodiments thereof and in a specific use, it is not desired that it be limited thereto, for obvious modifications thereof will occur to those skilled in the art without departing from the spirit and scope of the invention.

What I claim is:

1. A voltage regulated direct current power source for supplying a load, comprising a first electron discharge tube having an input circuit and an output circuit, said output circuit comprising in series circuit arrangement a capacitive element and a direct-current potential source, a first inductive element, means periodically to vary the conduction of said first discharge tube to vary the current in said inductive element thereby to produce alternating voltage pulses across said first inductive element, means coupled to said first inductance element to rectify said alternating voltage pulses to produce an output voltage, means to apply said output voltage to said load, a series circuit comprising a second inductive element inductively coupled to said first inductive element and a rectifier element, means to couple said series circuit to said capacitive element to apply to said capacitive element a rectified voltage having an amplitude proportional to the amplitude of said alternating voltage pulses, a second electron discharge tube coupled in parallel with said capacitive element, and means responsive to variations in said output voltage to vary the conduction of said second discharge tube thereby to vary the voltage across said capacitive element in a sense diminishing said output voltage variations.

2. A voltage regulated direct current power source for supplying a load, comprising a first electron discharge tube having an input circuit and an output circuit, said output circuit comprising in series circuit arrangement a capacitive element and a direct-current potential source, a first inductive element, means periodically to vary the conduction of said first discharge tube to vary the current in said first inductive element thereby to produce alternating voltage pulses across said first inductive element, means coupled to said first inductive element to rectify said alternating voltage pulses to produce an output voltage, means to apply said output voltage to said load, a series circuit comprising a second inductive element inductively coupled to said first inductive element and a rectifier element, means to couple said series circuit to said capacitive element to apply to said capacitive element a rectified voltage having an amplitude proportional to the amplitude of said alternating voltages pulses, a second electron discharge tube having cathode, grid and anode electrodes, means to couple said cathode and anode electrodes of said second discharge tube to respective terminals of said capacitive element and means coupled to the grid of said second discharge tube and responsive to variations in said output voltage to vary the conduction of said second discharge tube thereby to vary the voltage across said capacitive element in a sense diminishing said output voltage variations.

3. A voltage regulated direct current power source for supplying a load, comprising a first electron discharge tube having an input circuit and an output circuit, said output circuit comprising in series circuit arrangement a capacitive element and a direct-current potential source, a first inductive element, means to apply a saw tooth potential to the input circuit of said first discharge tube periodically to vary the conduction of said first discharge tube to vary the current in said first inductive element thereby to produce alternating voltage pulses across said first inductive element, means coupled to said first inductive element to rectify said alternating voltage pulses to produce an output voltage, means to apply said output voltage to said load, a series circuit comprising a second inductive element inductively coupled to said first inductive element and a rectifier element, means to couple said series circuit in parallel with said capacitive element to apply to said capacitive element a rectified voltage having an amplitude proportional to the amplitude of said alternating voltage pulses, a second electron discharge tube having cathode, grid and anode electrodes means to couple said cathode and anode electrodes of said second discharge tube to respective terminals of said capacitive element, and means coupled to the grid of said second discharge tube and responsive to variations in said output voltage to vary the conduction of said second discharge tube thereby to vary the voltage across said capacitive element in a sense diminishing said output voltage variations.

4. A voltage regulated direct current power source for supplying a load, comprising a first electron discharge tube having an input circuit and an output circuit, said output circuit comprising in series circuit arrangement a capacitive element, a first inductive element and a source of direct current potential, means periodically to vary the conduction of said first discharge tube to vary the current in said first inductive element thereby to produce alternating voltage pulses across said first inductive element, means coupled to said first inductive element to rectify said alternating voltage pulses to produce an output voltage, means to apply said output voltage to said load, a series circuit comprising a second inductive element inductively coupled to said first inductive element and a rectifier element, means to couple said series circuit to said capacitive element to apply to said capacitive element a rectified voltage having an amplitude proportional to the amplitude of said alternating voltage pulses, a second electron discharge tube having cathode, grid and anode electrodes, means to couple said cathode and anode electrodes of said second discharge tube to respective terminals of said capacitive element, potentiometer means having a tapping and being coupled in parallel with the series combination of said capacitive element and said source of direct current potential, and means to couple said tapping to the grid of said second discharge tube to apply to the grid of said discharge tube a voltage proportional to the voltage across said series combination thereby to vary the conduction of said second discharge tube and to vary the voltage across said capacitive element in a sense diminishing variations in said output voltage.

5. A voltage regulated direct current power source for supplying a load, comprising a first electron discharge tube having an input circuit and an output circuit, said output circuit comprising in series circuit arrangement a capacitive element and a direct-current potential source, a first inductive element, means periodically to vary the conduction of said discharge tube to vary the current in said first inductive element thereby to produce alternating voltage pulses across said first inductive element, means coupled to said first inductive element to rectify said alternating voltage pulses to produce an output voltage, means to apply said output voltage to said load, a series circuit comprising a second inductive element inductively coupled to said first inductive element and a first rectifier element, means to couple said series circuit to said capacitive element to apply to said capacitive element a first rectified voltage having an amplitude proportional to the amplitude of said alternating voltage pulses, a second electron discharge tube having cathode, control grid and anode electrodes, means to couple said cathode and anode electrodes of said second discharge tube to respective terminals of said capacitive element, a third inductive element inductively coupled to said first inductive element, and means comprising a second rectifier element intercoupling said third inductive element and the grid of said second discharge tube to derive from said third inductive element a second rectified voltage having an amplitude proportional to the amplitude of said output voltage and to apply said second rectified voltage to the grid of said second discharge tube thereby to vary the conduction of said second discharge tube and to vary the voltage across said capacitive element in a sense diminishing variations in said output voltage.

PETER JOHANNES
HUBERTUS JANSSEN.

REFERENCES CITED

The following references are of record in the file of this patent:

UNITED STATES PATENTS

| Number | Name | Date |
| --- | --- | --- |
| 2,435,414 | Sziklai et al. | Feb. 3, 1948 |